(12) United States Patent
Odendall

(10) Patent No.: US 8,146,347 B2
(45) Date of Patent: Apr. 3, 2012

(54) PROCESS FOR THE CONTROL OF CHARGING AND DISCHARGING OF AN OXYGEN RESERVOIR OF AN EXHAUST GAS CATALYTIC CONVERTER

(75) Inventor: Bodo Odendall, Buxheim (DE)

(73) Assignee: Audi AG, Ingolstadt (DE)

( * ) Notice: Subject to any disclaimer, the term of this patent is extended or adjusted under 35 U.S.C. 154(b) by 1316 days.

(21) Appl. No.: 11/296,507

(22) Filed: Dec. 8, 2005

(65) Prior Publication Data
US 2006/0123769 A1 Jun. 15, 2006

(30) Foreign Application Priority Data
Dec. 13, 2004 (DE) .......................... 10 2004 060 125

(51) Int. Cl.
*F01N 3/00* (2006.01)
(52) U.S. Cl. ................ 60/285; 60/274; 60/286; 60/295; 60/301
(58) Field of Classification Search .................... 60/273, 60/277, 284–289
See application file for complete search history.

(56) References Cited

U.S. PATENT DOCUMENTS

| | | | | | |
|---|---|---|---|---|---|
| 5,224,345 | A | * | 7/1993 | Schnaibel et al. | 60/274 |
| 5,359,852 | A | * | 11/1994 | Curran et al. | 60/274 |
| 5,901,552 | A | * | 5/1999 | Schnaibel et al. | 60/274 |
| 6,209,314 | B1 | * | 4/2001 | Staufenberg | 60/274 |
| 6,301,878 | B1 | * | 10/2001 | Zhang et al. | 60/274 |
| 6,463,733 | B1 | * | 10/2002 | Asik et al. | 60/276 |
| 6,550,307 | B1 | * | 4/2003 | Zhang et al. | 73/23.32 |
| 6,684,150 | B2 | * | 1/2004 | Yasui et al. | 701/106 |
| 6,684,628 | B2 | * | 2/2004 | Gobel et al. | 60/277 |
| 6,848,439 | B2 | * | 2/2005 | Ohkuma | 123/688 |
| 6,911,184 | B1 | * | 6/2005 | Matsunaga et al. | 422/110 |
| 2001/0000956 | A1 | * | 5/2001 | Honda et al. | 338/34 |
| 2002/0005039 | A1 | * | 1/2002 | Mussmann et al. | 60/285 |
| 2003/0010016 | A1 | * | 1/2003 | Beer et al. | 60/274 |
| 2003/0221415 | A1 | * | 12/2003 | Rosel et al. | 60/277 |
| 2004/0006973 | A1 | * | 1/2004 | Makki et al. | 60/285 |
| 2004/0040282 | A1 | * | 3/2004 | Zhu | 60/276 |
| 2004/0060550 | A1 | * | 4/2004 | Wu et al. | 123/694 |
| 2004/0103642 | A1 | * | 6/2004 | Rosel et al. | 60/274 |

FOREIGN PATENT DOCUMENTS

DE 100 26 379 A1 12/2001

(Continued)

*Primary Examiner* — Thomas Denion
*Assistant Examiner* — Jesse Bogue
(74) *Attorney, Agent, or Firm* — Novak Druce + Quigg LLP

(57) ABSTRACT

In a process for the control of charging and discharging of an oxygen reservoir (4) of an exhaust gas catalytic converter (3) as a function of the voltage signal ($U_{LSF}$) of a binary lambda probe (5) mounted downstream from the exhaust gas catalytic converter (3), it is proposed that according to the differentiation of the case the voltage signal ($U_{LSF}$) which has been output by the lambda probe (5) mounted downstream from the exhaust gas catalytic converter (3) is divided into three regions (A, B, C) which each trigger different control strategies for charging and discharging of the oxygen reservoir (4) of the exhaust gas catalytic converter (3). As proposed, economical binary lambda probes (5) can be used for favorable control of charging and discharging of the oxygen reservoir (4) in order to set or maintain the setpoint region of mean charging of the oxygen reservoir (4) from approximately 30 to 70% which is optimum for conversion of the exhaust emissions.

10 Claims, 3 Drawing Sheets

FOREIGN PATENT DOCUMENTS

| DE | 100 08 563 A1 | 5/2002 |
| DE | 100 08 564 A1 | 5/2002 |
| DE | 103 05 452 A1 | 7/2004 |
| DE | 103 07 457 A1 | 9/2004 |

\* cited by examiner

PROCESS FOR THE CONTROL OF CHARGING AND DISCHARGING OF AN OXYGEN RESERVOIR OF AN EXHAUST GAS CATALYTIC CONVERTER

CROSS REFERENCE TO RELATED APPLICATIONS

This application claims priority from DE 102004060125.9, filed Dec. 13, 2004, herein incorporated by reference in its entirety.

BACKGROUND OF THE INVENTION

This invention relates to a process for the control of charging and discharging of an oxygen reservoir of an exhaust gas catalytic converter as a function of the voltage signal of a binary lambda probe mounted downstream from the exhaust gas catalytic converter.

It is known that in order to detect the air/fuel mixture so-called binary lambda probes or jump probes are used which exhibit a steep voltage drop at a lambda value of 1.0. Above $\lambda=1.0$ there is only a small voltage and below $\lambda=1.0$ there is a higher constant voltage. Thus the range in which the voltage signal has a voltage signal proportional to the air/fuel mixture is very narrow, so that the voltage signal in itself does not allow control of the air/fuel mixture.

SUMMARY OF THE INVENTION

In this context the object of this invention is to make available a process for the control of charging and discharging of the oxygen reservoir of an exhaust gas catalytic converter as a function of the voltage signal of a binary lambda probe mounted downstream from the exhaust gas catalytic converter.

This object is achieved by the voltage signal which has been output by the lambda probe mounted downstream from the exhaust gas catalytic converter being divided into three regions A, B, C according to the differentiation of the case; these regions each trigger different control strategies for charging and discharging of the oxygen reservoir of the exhaust gas catalytic converter. In this way the voltage signal can be optimally used for control so that at any time its informative value is used accordingly for comparatively coarse or fine control of the charging and/or discharging of the oxygen reservoir of the exhaust gas catalytic converter.

The voltage signal of the lambda probe mounted downstream from the exhaust gas catalytic converter within the first region A causes charging of the oxygen reservoir of the exhaust gas catalytic converter, the charging being carried out until according to a suitable model computation the current charging state of the oxygen reservoir of the exhaust gas catalytic converter of at least approximately 30% is reached or exceeded or until the voltage signal leaves the first region again. Thus, for example, after full load operation a heavily discharged oxygen reservoir can be detected and refilled without a finely regulated control strategy of charging of the oxygen reservoir of the exhaust gas catalytic converter being necessary for this purpose.

The voltage signal of the lambda probe mounted downstream from the exhaust gas catalytic converter within the second region B causes or enables charging or discharging of the oxygen reservoir of the exhaust gas catalytic converter which is finely controlled as a function of the voltage signal, between mean charging of the oxygen reservoir from approximately 30 to 70%. This is because within this setpoint region the voltage signal is proportional to the charging of the oxygen reservoir, so that correspondingly good adjustment can occur for example to the setpoint of mean charging of the oxygen reservoir of approximately 50%, which setpoint is favorable for exhaust gas conversion.

If the lambda setpoint is subjected to forced modulation during the finely controlled charging or discharging of the oxygen reservoir, improved conversion of the exhaust gas emissions can be achieved by charging and discharging of the oxygen reservoir which takes place cyclically based on dynamic effects.

The voltage signal of the lambda probe mounted downstream from the exhaust gas catalytic converter should be provided with a signal correction value for compensation of forced modulation. The signal correction value prevents the voltage signal from running behind the lambda setpoint, and in spite of forced modulation a controller deviation between "theoretical" and "actual" of oxygen filling is avoided.

And the voltage signal of the lambda probe mounted downstream from the exhaust gas catalytic converter within the third region C causes discharging of the oxygen reservoir of the exhaust gas catalytic converter, the discharging being carried out until according to a suitable model computation the current charging state of the oxygen reservoir of the exhaust gas catalytic converter of at most approximately 70% is reached or not reached and until the voltage signal leaves the third region again. Thus, for example, after a coasting mode the fully loaded oxygen reservoir can be detected and quickly discharged again, since an especially finely regulated control strategy for discharging of the oxygen reservoir of the exhaust gas catalytic converter is not necessary here either.

For model computation primarily the lambda signal or the voltage signal of a second lambda probe mounted upstream from the exhaust gas catalytic converter is evaluated, and the lambda signal could also originate from examination of the model. The current charging state of the oxygen reservoir is determined from the balance of the performed charging(s) and discharging(s) with oxygen. In the regions of a nonproportional relationship between the voltage signal of the lambda probe mounted downstream and charging of the oxygen reservoir, relatively accurate determination of the current charging state of the oxygen reservoir can also take place by means of this model computation.

Moreover, for model computation the voltage signal of the lambda probe mounted downstream from the exhaust gas catalytic converter can also be evaluated in order to set the current charging state of the oxygen reservoir back to a corresponding mean setpoint of charging of the oxygen reservoir between 30 and 70% when the voltage signal assumes a specific value within the second region B. The occasional resetting prevents the values determined from the measured voltage signals and from the model computation for charging of the oxygen reservoir from diverging from one another.

Alternatively, the model computation could also take place quite without evaluation of the voltage signals of the first or second lambda probe, that is, solely based on different operating parameters of the internal combustion engine, such as for example speed, injection amount, throttle valve position, temperature, etc.

Advantageously the rate of charging and the rate of discharging of the oxygen reservoir of the exhaust gas catalytic converter are varied depending on the interval to the setpoint or setpoint region of charging of the oxygen reservoir, the ageing of the exhaust gas catalytic converter, the temperature of the exhaust gas catalytic converter, and/or mass of the exhaust gas. This is because the maximum rate for charging and discharging of the oxygen reservoir of the exhaust gas catalytic converter may not be exceeded, since otherwise the conversion of the exhaust emissions would be drastically degraded.

Advantageously the first region A of the voltage signal of the lambda probe mounted downstream from the exhaust gas catalytic converter is above approximately 700 millivolts, the second region B of the voltage signal extends from approximately 600 to 700 millivolts, and the third region C of the voltage signal is below approximately 600 millivolts. Accordingly, in the second region of the voltage signal the average value is approximately 650 millivolts and the amplitude modulation of this average value is a maximum ±50 millivolts. The voltage values indicated in the foregoing can however also be chosen somewhat differently for other lambda probes in order to implement three suitable regions for charging, for fine control of charging and discharging, and for discharging of the oxygen reservoir of the exhaust gas catalytic converter.

BRIEF DESCRIPTION OF THE DRAWINGS

This invention is detailed with reference to the following drawings, in which

FIG. 1 shows a schematic of an internal combustion engine 1 with an exhaust system 2.

DETAILED DESCRIPTION OF THE INVENTION

Figure 1:
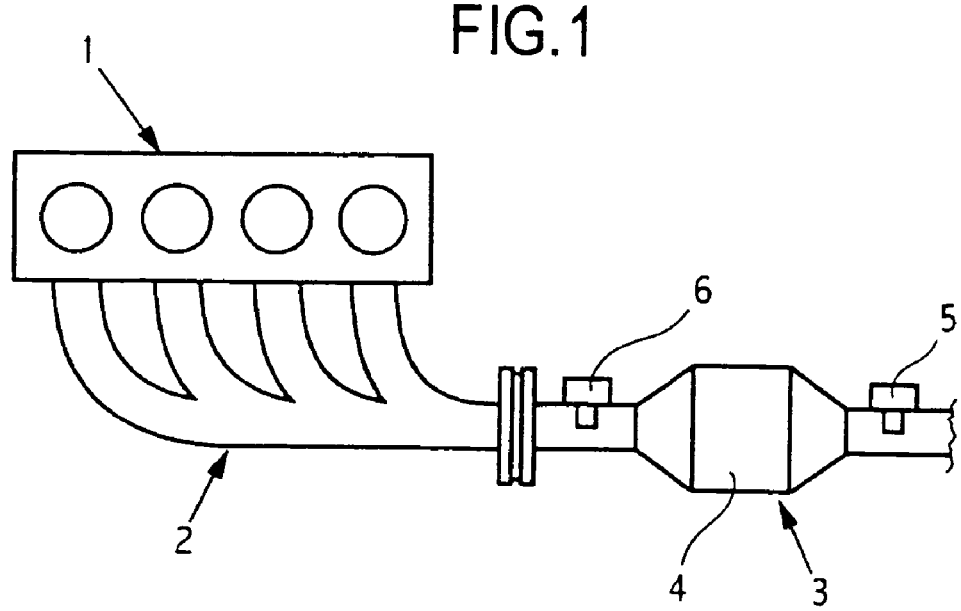
FIG. 1 shows a schematic of an internal combustion engine with an exhaust gas system.

The exhaust system 2 comprises an exhaust gas catalytic converter 3 which is made for example as a NOx storage catalytic converter or as an active particle filter and which contains an integrated oxygen reservoir 4, a lambda probe 5 mounted downstream from the exhaust gas catalytic converter 3 and which is used as a guide probe, and a second lambda probe 6 mounted upstream from the exhaust gas catalytic converter 3 and which is used as a control probe.

The lambda probe 5 mounted downstream from the exhaust gas catalytic converter 3 delivers a voltage signal $U_{LSF}$ which outputs the lambda value λ downstream from the catalytic converter and which can be evaluated as the actual value for mean charging of the oxygen reservoir 4. Depending on this actual value, charging and discharging of the oxygen reservoir 4 are adjusted to a given setpoint. This setpoint of charging of the oxygen reservoir 4 is preferably 50% and can be subject to a specific forced modulation within the setpoint region between 30 and 70%.

Figure 2:
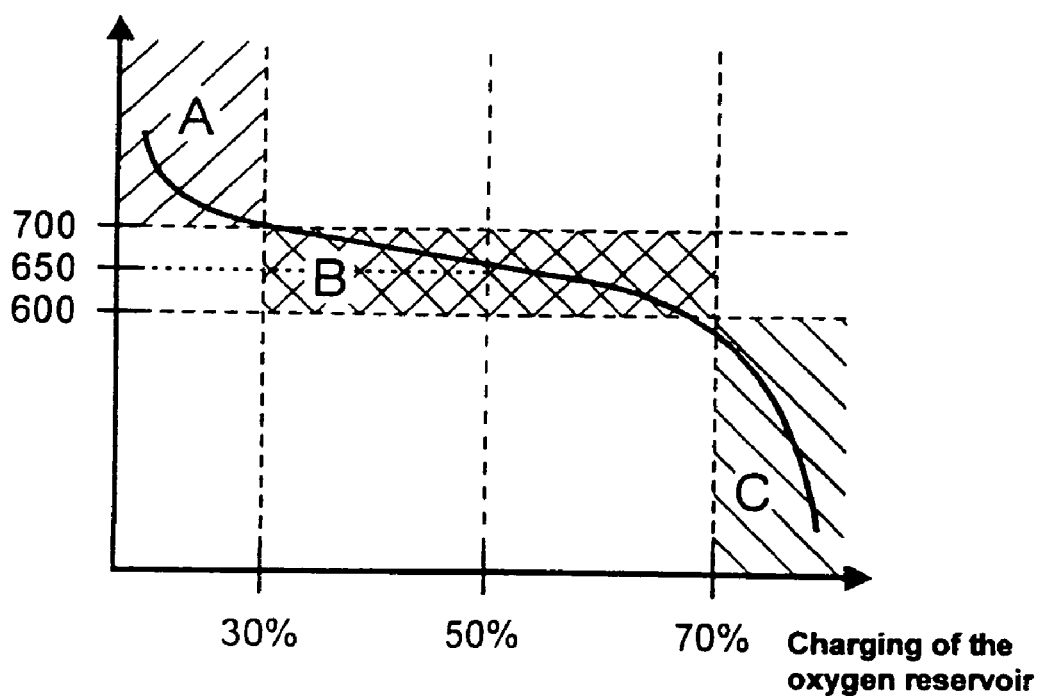
FIG. 2 shows a diagram of the voltage signal of a lambda probe mounted downstream from an exhaust gas catalytic converter over the average charging of the oxygen reservoir of the exhaust gas catalytic converter.

FIG. 2 shows the voltage characteristic of a binary lambda probe 5 which can be divided into three regions A, B, C.

In the first region A the voltage signal $U_{LSF}$ assigned to the mean charging of the oxygen reservoir 4 of less than 30% is above 700 millivolts, based on the nonlinear trace of the curve in this region A there being no proportionality between mean charging of the oxygen reservoir 4 and the voltage signal $U_{LSF}$ of the lambda probe 5.

In the second region B the voltage signal $U_{LSF}$ assigned to mean charging of the oxygen reservoir 4 from approximately 30% to 70% extends from approximately 600 to 700 millivolts and is approximately linearly so that a good correlation for the charging state can be derived from the voltage signal $U_{LSF}$.

And in the third region C the voltage signal $U_{LSF}$ assigned to mean charging of the oxygen reservoir 4 of greater than 70% is less than 600 millivolts and in turn runs is nonlinear.

For optimum conversion of the emissions contained in the exhaust gas, specifically hydrocarbon (HC) and nitrogen oxides (NOx), the mean charging of the oxygen reservoir 4 must be in the setpoint region between 30 and 70%. This is because for lower charging the hydrocarbon is no longer reacted to an adequate degree and at higher charging the nitrogen oxides are no longer satisfactorily reacted.

Therefore it always applies when charging is less than 30% or above 70% that the mean charging of the oxygen reservoir 4 be again set back into the setpoint region from 30 to 70%. In order for the control strategy to accomplish this, charging or discharging is triggered based on the voltage signal $U_{LSF}$, and by a mathematical model computation for example using the lambda signal or the voltage signal $U_{LSR}$ of the lambda probe 6 mounted upstream from the exhaust gas catalytic converter 3 the interval to the setpoint or setpoint region of charging or the amount of oxygen to be added again to the oxygen reservoir 4 or to be discharged can be determined so that the filling state is again returned to the setpoint region.

In this model computation for example after a coasting mode of the internal combustion engine 1 a completely filled oxygen reservoir 4 of the exhaust gas catalytic converter 3 is deduced and it is estimated what amount of oxygen must be discharged or released until the fill state of the oxygen reservoir 4 is again within the setpoint region. The actually discharged amount of oxygen is then computed using the voltage signal $U_{LSR}$ of the lambda probe 6 mounted upstream from the exhaust gas catalytic converter 3.

And after full load operation of the internal combustion engine 1 the fill state of the completely or partially discharged oxygen reservoir 4 is determined by a corresponding evaluation of the voltage signal $U_{LSR}$ of the lambda probe 6 mounted upstream from the exhaust gas catalytic converter 3 and it is computed what amount of oxygen must be charged or added for the fill state to be within the setpoint region again. Finally, the actually added amount of oxygen is then computed likewise using the voltage signal $U_{LSR}$ of the lambda probe 6 mounted upstream from the exhaust gas catalytic converter 3.

If the voltage signal $U_{LSF}$ of the lambda probe 5 mounted downstream from the exhaust gas catalytic converter 3 is within the second region B, there is a signal correction value of the voltage signal $U_{LSF}$ for taking into account the forced modulation of the air/fuel ratio λ=1.0±Δλ which is set upstream from the internal combustion engine 1. For this reason for example amplitude modulation of approximately ±50 millivolts matched to the forced modulation of the lambda setpoint is applied to the average value of the voltage signal $U_{LSF}$ of 650 millivolts in order to compensate for the fluctuations of the voltage signal $U_{LSF}$ resulting from the forced modulation.

Figure 3:
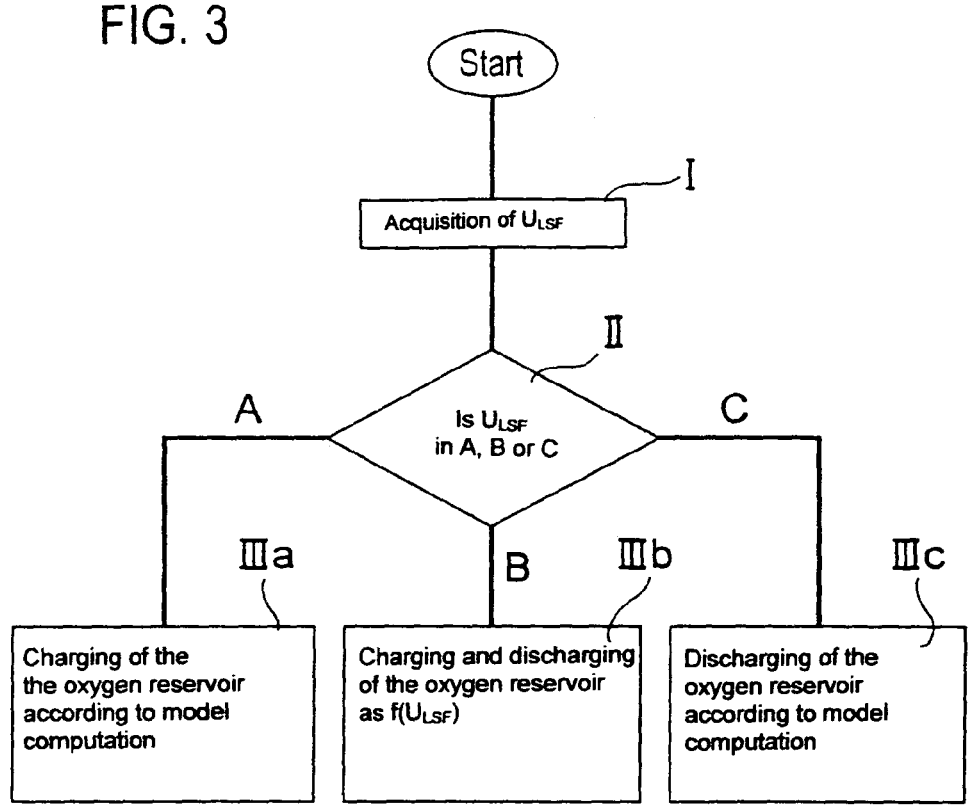
FIG. 3 shows a first simplified flow chart of the process for the control of charging and discharging of the oxygen reservoir of the exhaust gas catalytic converter.

The flow chart of the process as claimed in the invention shown in FIG. 3 in the first step I calls for acquisition of the voltage signal $U_{LSF}$ of a binary lambda probe 5 mounted downstream from the exhaust gas catalytic converter 3.

According to the second step II this voltage signal $U_{LSF}$ is subjected to a case differentiation which assigns the voltage signal $U_{LSF}$ according to its value to one of the three regions A, B, or C.

In the next step IIIa, IIIb, IIIc, depending on in which of the regions A, B, or C the voltage signal $U_{LSF}$ is found, one of three different control strategies is triggered. The control strategy assigned to the first region A calls for charging of the oxygen reservoir 4, that is, the operation of the internal combustion engine 1 which is connected upstream from the exhaust gas catalytic converter 3 with a lean air/fuel mixture, the control strategy assigned to the second region B proportionally to the voltage signal $U_{LSF}$ calls for finely controlled charging and/or discharging of the oxygen reservoir 4, and the control strategy assigned to the third region C calls for discharging of the oxygen reservoir 4, that is, the operation of the internal combustion engine 1 which is connected upstream from the exhaust gas catalytic converter 3 with a rich air/fuel mixture. Accordingly, mean charging of the oxygen reservoir 4 is always set back into the setpoint region from 30 to 70% or continues to be kept within this setpoint region. Here the charging assigned to the first region, and also the discharging assigned to the third region take place based on the above explained model computation which is based on the lambda values or voltage values $U_{LSR}$ of a second lambda probe 6 or different operating parameters of the internal combustion engine.

If the voltage signal $U_{LSF}$ for example leaves its previous region A, B, or C as a result of charging or discharging of the oxygen reservoir 4 or as a result of a coasting mode or full load operation of the internal combustion engine 1, switching simply to the respective control strategy of the new region A, B, or C takes place and charging of the oxygen reservoir 4 is finally returned again to the setpoint region from 30 to 70% or continues to be kept in this setpoint region in order to optimize conversion of the emissions contained in the exhaust gas.

Figure 4:
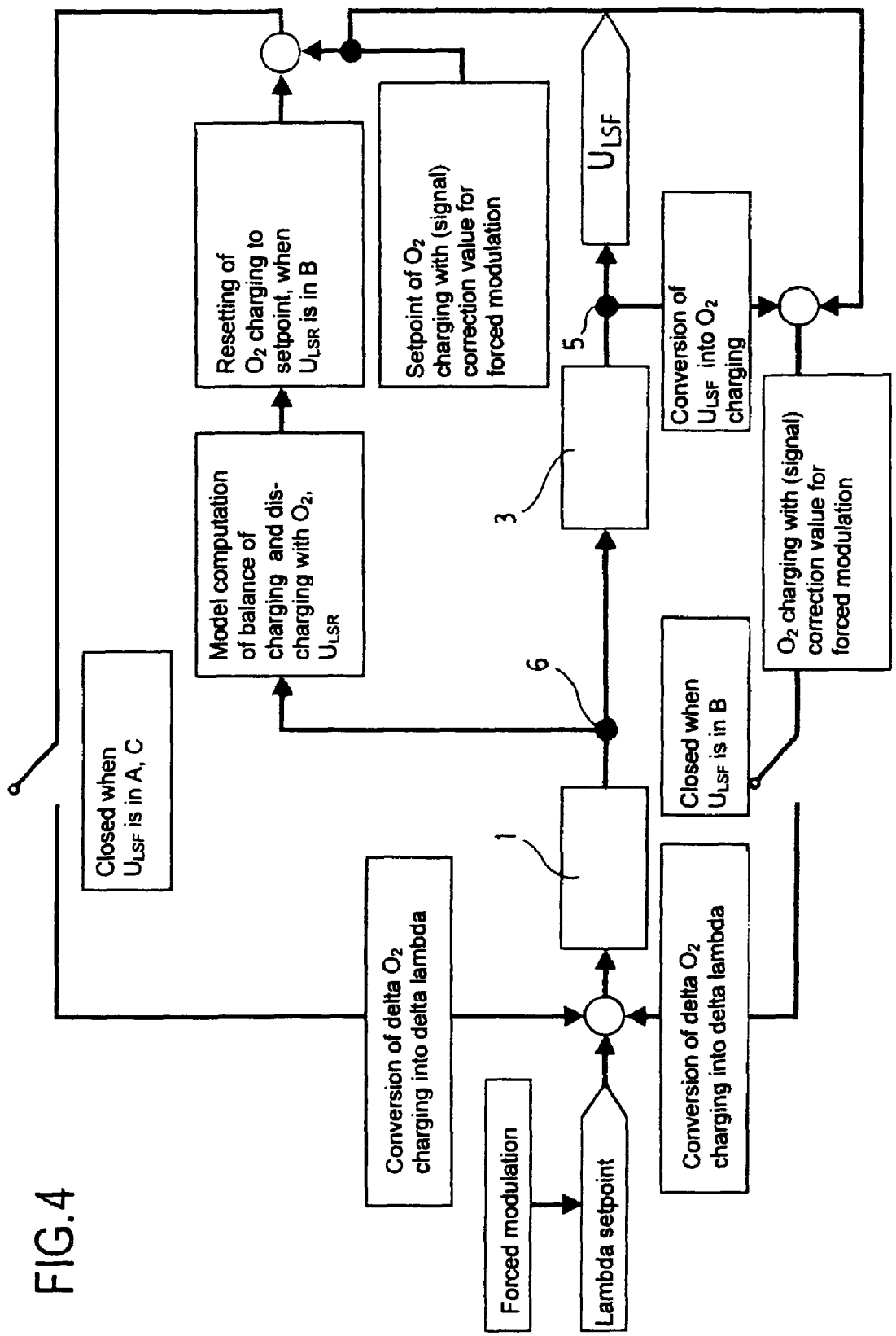
FIG. 4 shows a second flow chart of the process.

The flow chart from FIG. 4 again shows the process as claimed in the invention with the different control strategies which carry out charging and discharging of the oxygen reservoir 4 in the regions A and C using a suitable model computation and in region B using the voltage signal $U_{LSF}$ of the lambda probe 5 mounted downstream from the exhaust gas catalytic converter 3.

According to the model computation, the current loading state of the oxygen reservoir 4 is carried out based on the lambda signal or on the voltage signal $U_{LSR}$ of the lambda probe 6 mounted upstream from the exhaust gas catalytic converter 3 by means of balancing of the charging and discharging with oxygen ($O_2$) and when a specific voltage signal $U_{LSF}$ of the lambda probe 5 mounted downstream from the exhaust gas catalytic converter 3 is present, within the second region B, for example when $U_{LSF}$=650 millivolts, the current charging state of the oxygen reservoir 4 is set back to mean charging of the oxygen reservoir 4 of for example 50%.

The voltage signal $U_{LSF}$ of the lambda probe 5 mounted downstream from the exhaust gas catalytic converter 3 is converted directly into mean charging of the oxygen reservoir 4 based on its proportionality to the current charging state of the oxygen reservoir 4. In doing so it is optionally taken into account that for forced modulation of the lambda setpoint the voltage signal $U_{LSF}$ of the lambda probe 5 which is connected downstream from the exhaust gas catalytic converter 3 must be provided with a signal correction value and that charging of the oxygen reservoir 4 which is proportional to the voltage signal $U_{LSF}$ must be provided with a corresponding correction value.

REFERENCE NUMBER LIST

1 internal combustion engine
2 exhaust system
3 exhaust gas catalytic converter
4 oxygen reservoir
5 lambda probe downstream from 3
6 lambda probe upstream from 3
$U_{LSF}$ voltage signal of 5
$U_{LSR}$ voltage signal of 6
A first region of the voltage signal $U_{LSF}$
B second region of the voltage signal $U_{LSF}$
C third region of the voltage signal $U_{LSF}$

I claim:

1. A process for the control of charging and discharging of an oxygen reservoir of an exhaust gas catalytic converter as a function of a voltage signal of a binary lambda probe mounted downstream from the exhaust gas catalytic converter,
wherein, when the voltage signal falls within a first region corresponding to a current charging state of the oxygen reservoir of the exhaust gas catalytic converter of less than approximately 30%, the method comprises:
charging the exhaust gas catalytic converter until a current charging state of the oxygen reservoir of at least approximately 30% is reached;
wherein, when the voltage signal falls within a second region corresponding to a current charging state of the oxygen reservoir of between approximately 30% and approximately 70%, the method comprises:
finely controlling the charging and discharging of the oxygen reservoir as a function of the voltage signal to maintain the voltage signal about a lambda set point, and
simultaneously subjecting the lambda setpoint to forced modulation to cause a cyclical charging and discharging of the oxygen reservoir; and
wherein, when the voltage signal falls within a third region corresponding to a current charging state of the oxygen reservoir of the exhaust gas catalytic converter of greater than approximately 70%, the method comprises:
discharging the exhaust gas catalytic converter until a current charging state of the oxygen reservoir of at most approximately 70% is reached, and
varying the rate of charging and the rate of discharging of the oxygen reservoir of the exhaust gas catalytic converter depending on at least one factor to avoid exceeding a predefined maximum rate for charging and discharging the oxygen reservoir.

2. The process as claimed in claim 1, wherein the voltage signal of the lambda probe mounted downstream from the exhaust gas catalytic converter is provided with a signal correction value for compensation of forced modulation.

3. The process as claimed in claim 1, further comprising evaluating a second voltage signal of a second lambda probe mounted upstream from the exhaust gas catalytic converter to determine the current charging state of the oxygen reservoir from the balance of the performed charging and discharging.

4. The process as claimed in claim 1, further comprising evaluating the voltage signal of the lambda probe mounted downstream from the exhaust gas catalytic converter to set the current charging state of the oxygen reservoir back to a corresponding mean setpoint of charging of the oxygen reservoir between 30 and 70% when the voltage signal assumes a specific value within the second region.

5. The process as claimed in claim 1, wherein the first region of the voltage signal of the lambda probe mounted downstream from the exhaust gas catalytic converter is above approximately 700 millivolts, the second region extends from approximately 600 to 700 millivolts, and the third region is below approximately 600 millivolts.

6. The process as claimed in claim 1, wherein the at least one factor is an interval to a setpoint region of charging of the oxygen reservoir.

7. The process as claimed in claim 1, wherein the at least one factor is an interval to a setpoint of charging of the oxygen reservoir.

8. The process as claimed in claim 1, wherein the at least one factor is an ageing of the exhaust gas catalytic converter.

9. The process as claimed in claim 1, wherein the at least one factor is a temperature of the exhaust gas catalytic converter.

10. The process as claimed in claim 1, wherein the at least one factor is a mass of the exhaust gas.

* * * * *